Aug. 24, 1943.  R. M. HEINTZ  2,327,786

COOLING METHOD AND APPARATUS

Filed Sept. 15, 1941

Ralph M. Heintz, Inventor

By Robb & Robb

Attorneys

Patented Aug. 24, 1943

2,327,786

UNITED STATES PATENT OFFICE 2,327,786

COOLING METHOD AND APPARATUS

Ralph M. Heintz, Shaker Heights, Ohio, assignor to Jack & Heintz, Inc., Cleveland, Ohio, a corporation Application September 15, 1941, Serial No. 410,939.

3 Claims. (Cl. 171—252)

This invention relates to methods of circulating cooling mediums adapted for cooling the interior of heated masses, particularly suited where used in connection with the cooling of high speed electric motors such as are used in aircraft starting mechanisms.

Many different cooling systems have been devised to accomplish the desirable end of increasing the efficiency of small electric motors, but, on the whole, the methods devised are not entirely satisfactory because they are not self-contained, and are low in efficiency. It is well known that a great deal of heat is generated in the armature of an electric motor under driving conditions and this results in eventual breaking down of the insulation of the various parts of the motor and, consequently, loss of efficiency over a period of time.

This invention is particularly suited, as before stated, to incorporation in small electric motors because it is self-contained and operates on a very efficient principle to cause the cooling effect in the rotor or armature.

It is within the scope of this invention to adapt the cooling method and apparatus embodied herein for many different purposes, such as will be obvious to those skilled in the art, primarily where the radiating surface or surfaces of motors or generators, or the like, are small in comparison to the desired horse power output of the motor. In order to show the particular embodiment of the cooling method in an apparatus, the disclosure is made in its adaptation to a small electric motor.

An object of this invention, therefore, is to provide a circulating method of embodiment in a cooling system wherein the medium used in the cooling system is one which does not change its state. That is, it constantly remains a liquid throughout its cooling action and its absorption of heat from the device in which it is incorporated.

A further object of this invention is to provide a novel form of apparatus designed for use for the method of the invention.

Figure 1:
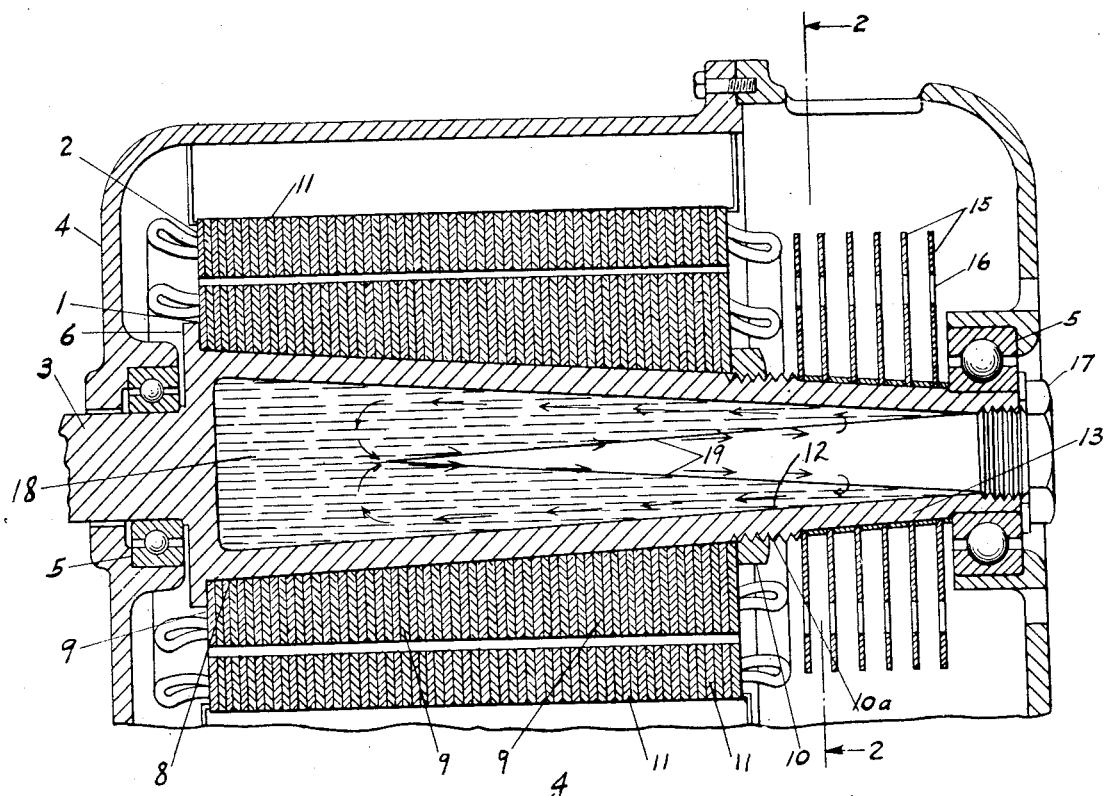
Figure 1 is a longitudinal sectional view somewhat diagrammatically illustrating the motor structure and certain features of the structure, embodying the invention.
Figure 2:
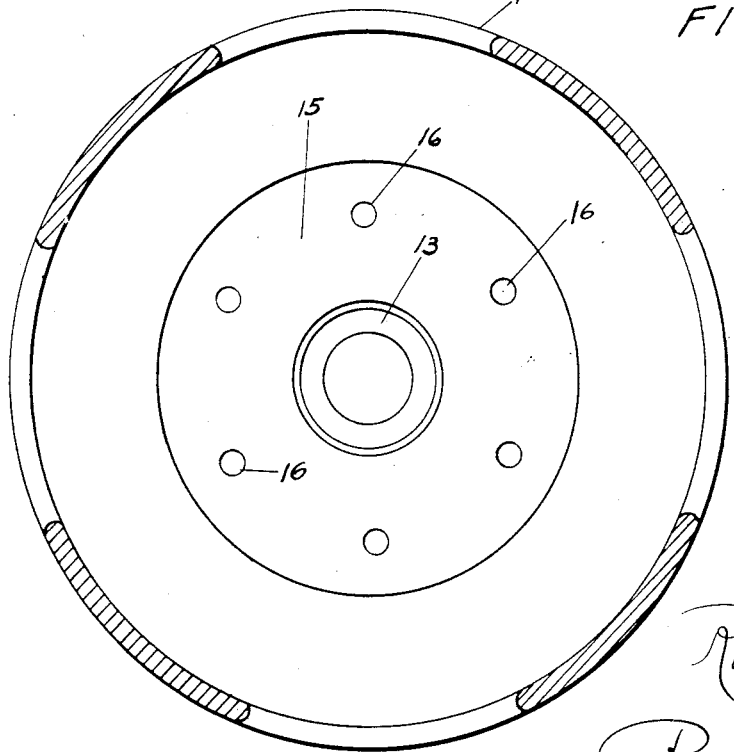
Figure 2 is a sectional view taken on the line 2—2 of Figure 1.

Referring to Figure 1, the showing broadly includes a motor rotor 1 operating within a stator or field 2. The rotor 1 embodies a shaft 3 having a conical opening or interior 12, the stator or field 2 and the rotor being enclosed in a housing 4. The shaft 3 is supported, as illustrated, by suitable bearing members 5 at the ends thereof and is adapted to rotate therein in the conventional manner.

The shaft 3 of the rotor has a generally conical exterior 8 upon which the laminated members 9, comprising a rotor portion, are adapted to be supported and seated against a flange member 6 at one end of the shaft 3. The laminated members 9 are mounted on the exterior of the shaft 3 and held thereon by a suitable nut 10 screwed onto threads 10a of the shaft. This construction is generally understood and is conventional to a great degree, except for the conical exterior 8 and interior 12 of the shaft. It will be understood that the laminated members 9 are furnished with smaller openings for placement on the smaller end of the shaft, and larger openings for seating on the larger end of the shaft.

The field or stator is likewise generally made up of laminated members 11, and this is of course conventional construction.

At one end of the shaft 3 are mounted suitable cooling members 15, preferably in the form of circular discs having openings 16 spaced near the circumference of the discs and adapted during the rotation of the shaft 3 to cause movement of cooling air over the end 13 of the shaft.

Since the shaft 3 is a hollow shaft having a conical interior, as above described, it is suitably closed at one end by the metal comprising the shaft, and at the other end is adapted to be closed, after introduction of the cooling medium 18 therein, by means of a suitable nut or closure member 17, whereby the liquid will be confined within the shaft. It is preferable that the liquid be placed in the shaft after evacuation thereof in order to increase the efficiency of operation, and to increase the speed with which the cooling medium is circulated.

The cooling liquid 18 is shown in the shaft in the position it assumes during rotation thereof, and the surfaces 19 will assume a somewhat reverse conical taper to that of the interior 12 of the shaft when heat is being generated within the laminated portions 9 of the rotor 1.

In operation, the motor is energized in the usual manner and thereafter the cooling medium 18 is heated by conduction of the heat through the wall of the shaft to the cooling medium, causing the cooling medium to expand. The cooling medium is preferably one which has a low specific heat and a large coefficient of expansion, for purposes that will be apparent in the further description of the operation of the method. Mercury may preferably be used for medium 18.

As the heat is transferred from the laminated portion of the rotor to the medium, and the expansion thereof takes place, the medium will be caused to flow toward the smaller end of the interior of the shaft and generally over the interior surface 19 of the medium, and when it reaches the smaller end of the shaft, the heat will be transferred to the cooling air being circulated over the smaller end by means of the cooling fins or means 15 circulating air over the exterior of the shaft and the cooling air will absorb the heat of the medium within the shaft. The liquid, during the rotation of the shaft, will, of course, cover the interior thereof, and when it is cooled at the smaller end, as above described, it will contract. In view of the tapering or conical interior of the shaft, the medium 18 will be caused to flow toward the larger end thereof by centrifugal force and thereafter be in a position to absorb the heat from the rotor laminations as above described, and expand, and therefore a cycle of circulation of the medium will be seen to be effected.

The desirable feature of this invention is that the cooling liquid or medium is one which does not change its state; that is, it always remains a liquid or in a liquid form, and therefore, in view of the fact that it also has a low specific heat and a relatively great coefficient of expansion, the cooling circulation will be very rapid and efficient. Of course, it will be understood that the showing in the drawing is a somewhat exaggerated showing of the conical interior of the shaft, and the surface 19 of the liquid is shown as being reversely conically tapered, primarily to illustrate that the degree of expansion of the medium within the shaft will be relatively less as the medium approaches the smaller end of the shaft because a certain amount of cooling action will be transferred to the metal from which the shaft is formed, and therefore prevent as great a degree of expansion along those points as takes place at the large end of the conical shaft.

It will be further seen that it is within the scope of this invention to form the interior of the shaft of a section wherein the larger portion of the conical interior is at the middle of the laminated portion of the rotor, and there are provided smaller portions at both ends thereof with suitable cooling means likewise furnished at these small ends, and thus in many cases even a greater degree of efficiency and rapidity of circulation of the medium within the shaft will be caused to take place.

From the foregoing it will be apparent that during the operation of the motor, which means rotation of the rotor, the cooling medium 18 will be caused to expand toward the axis of the shaft, as indicated by the arrows in Figure 1. Thereafter, it will be caused to flow by centrifugal force toward the smaller end of the shaft generally along the conical interior of the surface 19, as indicated by arrows, and, when cooled and contracted, flow along the interior surface 12 by centrifugal force. The arrows indicate the general cycle of flow of the medium during the cooling phase, as outlined above.

It should be understood that while in the foregoing description repeated reference is made to a shaft with a conically bored hole, it is within the scope of this invention that the foregoing system is operable with a shaft of straight bore with somewhat impaired circulation.

Having thus described my invention, what I claim as new and desire to secure by Letters Patent of the United States is:

1. A motor comprising a shaft having a conical axial bore therein, a motor rotor mounted on said shaft and surrounding the larger end portion of said bore, a plurality of cooling fins mounted on said shaft adjacent the smaller end of said bore, and a liquid, expansible by the heat generated in said rotor and contractable by said cooling means, sealed in the bore.

2. A motor having a shaft with a conical axial bore therein, a rotor mounted on said shaft and surrounding the larger end portion of said bore, cooling means on said shaft adjacent the smaller end portion of said bore, means for sealing said bore, and a cooling medium expansible by the running heat of said rotor, sealed in said bore.

3. A motor comprising a shaft having a conical axial bore therein, a motor rotor mounted on said shaft and surrounding the larger end portion of said bore, and a plurality of parallel circular cooling fins mounted on said shaft adjacent the smaller end portion of said bore, said cooling fins having apertures adjacent said shaft, air entering said apertures being discharged between said cooling fins.

RALPH M. HEINTZ.